(12) United States Patent
Kawamura et al.

(10) Patent No.: US 6,989,881 B2
(45) Date of Patent: *Jan. 24, 2006

(54) DISPLAY DEVICE WITH SIGNAL LINE EXTENDED FROM DISPLAY AREA TO PERIPHERAL AREA BEING COVERED IN PERIPHERAL AREA

(75) Inventors: Tetsuya Kawamura, Mobara (JP); Takeshi Tanaka, Chiba (JP); Kikuo Ono, Mobara (JP); Masaaki Matsuda, Mobara (JP); Kouichi Anno, Mobara (JP); Hiroshi Okawara, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/779,743

(22) Filed: Feb. 18, 2004

(65) Prior Publication Data

US 2004/0160565 A1 Aug. 19, 2004

Related U.S. Application Data (63) Continuation of application No. 09/534,520, filed on Mar. 24, 2000, now Pat. No. 6,697,139.

(30) Foreign Application Priority Data

Mar. 25, 1999 (JP) ............................................. 11-081094

(51) Int. Cl.
*G02F 1/1345* (2006.01)
*G02F 1/1343* (2006.01)
*G02F 1/1339* (2006.01)

(52) U.S. Cl. ........................ 349/149; 349/153; 349/139

(58) Field of Classification Search ................. 349/149, 349/139, 138, 147, 153, 190, 151
See application file for complete search history.

(56) References Cited

U.S. PATENT DOCUMENTS

| 4,960,719 | A | | 10/1990 | Tamaka et al. | |
|---|---|---|---|---|---|
| 5,541,748 | A | * | 7/1996 | Ono et al. | 349/42 |
| 5,798,744 | A | * | 8/1998 | Tanaka et al. | 345/92 |
| 5,812,231 | A | * | 9/1998 | Kochi et al. | 349/151 |
| 5,847,781 | A | * | 12/1998 | Ono et al. | 349/44 |
| 6,304,308 | B1 | * | 10/2001 | Saito et al. | 349/155 |
| 6,310,667 | B1 | * | 10/2001 | Nakayoshi et al. | 349/42 |
| 2002/0009447 | A1 | * | 1/2002 | Hooper et al. | 424/147.1 |
| 2002/0109801 | A1 | * | 8/2002 | Ono et al. | 349/43 |
| 2002/0132385 | A1 | * | 9/2002 | Dojo et al. | 438/30 |

FOREIGN PATENT DOCUMENTS

| JP | 02-068524 | 3/1990 |
|---|---|---|
| JP | 03-064737 | 3/1991 |
| JP | 05-232497 | 9/1993 |
| JP | 07-084270 | 3/1995 |
| JP | 07-142533 | 6/1995 |
| JP | 61-017126 | 1/1996 |
| JP | 10-161149 | 6/1998 |

* cited by examiner

*Primary Examiner*—Tarifur R. Chowdhury
*Assistant Examiner*—Mike Qi
(74) *Attorney, Agent, or Firm*—Antonelli, Terry, Stout and Kraus, LLP.

(57) ABSTRACT

A display device having a substrate, and a display area and a peripheral area being formed on the substrate. A signal line is extended from the display area to the peripheral area on the substrate, and the signal line at the peripheral area is covered with a first insulating film, a semiconductor layer, and a second insulating film in this order.

29 Claims, 5 Drawing Sheets

DISPLAY DEVICE WITH SIGNAL LINE EXTENDED FROM DISPLAY AREA TO PERIPHERAL AREA BEING COVERED IN PERIPHERAL AREA

CROSS REFERENCE TO RELATE APPLICATION

This is a continuation of U.S. application Ser. No. 09/534,520, field Mar. 24, 2000, now U.S. Pat. No. 6,697,139, the subject matter of which is incorporated by reference herein.

BACKGROUND OF THE INVENTION

The present invention relates to a liquid crystal display device in which it is possible to avoid corrosion of the signal lines thereof.

A liquid crystal display device includes a panel made of substrates disposed so as to be opposed to each other with a liquid crystal interposed therebetween, and the display device is provided with numerous pixels disposed in a matrix arrangement over the area of the liquid crystal. In the case of a reflection type of liquid crystal display device, at least one of the pair of substrates is a transparent substrate; whereas, in the case of a transmission type of liquid crystal display device, both substrates are transparent substrates. The term "transparent substrate" used herein is not limited to a substrate in which tight absorption does not at all occur, but encompasses a substrate which allows light propagating through the liquid crystal to be transmitted through the substrate at an intensity sufficient to enable a user of the liquid crystal display device to recognize an image reproduced by the propagating light. A transmission type liquid crystal display device will be described below by way of example.

Means for generating an electric field which corresponds to a video signal is incorporated into each pixel arranged on the liquid-crystal-side (or the liquid-crystal-layer-side) of the main surface of one of the pair of transparent substrates, whereby the optical transmissivity of the liquid crystal can be controlled according to the strength of the electric field. For this reason, signal lines which supply signals to the respective pixel areas are formed over the liquid-crystal-side main surface of the one of the pair of substrates, and these signal lines are disposed to extend outward of the panel.

Specifically, the one transparent substrate (the substrate over which the signal lines are formed) of the pair of transparent substrates constituting the panel is constructed to be slightly larger in area than the other transparent substrate, and the signal lines are disposed so as to extend into the area of the one transparent substrate which extends beyond the other substrate (in other words, the area of the one transparent substrate which protrudes beyond and is not overlapped by the other transparent substrate, and these signal lines are connected to an external circuit.

Incidentally, a sealing material is arranged in a portion equivalent to the periphery of the other transparent substrate, whereby the other substrate is fixed to the one transparent substrate. These transparent substrates are combined so that a predetermined gap is maintained between the main surfaces thereof, and the liquid crystal is sealed in the gap. Concretely, a region surrounded by the sealing material is formed in a space lying between the pair of substrates, and this region forms a space for containing the liquid crystals.

SUMMARY OF THE INVENTION

However, in, the liquid crystal display device constructed in the manner described above, it has been formed that disconnections due to corrosion occasionally will occur in the signal lines which extend from the inside of the region surrounded by the sealing material (the area in which the liquid crystal is sealed) to the outside thereof. A technique for solving the problem of corrosion of the signal lines is described in, for example, each of Japanese Patent Application Laid-Open Nos. 326942/1999, 113922/1997 and 90394/1997.

The signal lines which extend from the inside of the area surrounded by the sealing material have heretofore been covered with a film formed by expanding a protective film, disposed in a display area comprising an assembly of pixels, to the edge portions of the substrates (hereinafter referred to as the expanded film). The present inventors have carried out research to determine why the above-described corrosion of the signal lines occurs even in a liquid crystal display device having this construction, and have found that, if there is a defect, such as a pinhole in the expanded film, a signal line disposed below the defective portion tends to corrode.

In recent years, the distance between a signal line and another signal line adjacent thereto is becoming smaller and the electric field strength therebetween is becoming larger, so that there is a stronger possibility that the above-described corrosion of the signal lines will be promoted. In addition, even if no disconnection occurs, there is no denying the fact that the corrosion of a signal line may reach the bottom of a sealing material, so that a leakage hole may be produced in the sealing material and a leakage defect of the liquid crystal may occur.

The present invention has been made on the basis of the above-described circumstances, and an object of the present invention is to provide a liquid crystal display device which is capable of preventing corrosion from occurring in signal lines which are formed to extend from inside an area of a main surface of one of a pair of substrates into an outside area, the inside area being generally surrounded by a sealing material (an area opposed to a liquid crystal layer).

A representative aspect of the invention disclosed in the present application will be described below in brief.

The liquid crystal display device of the present invention has a pair of substrates disposed to oppose one another with a liquid crystal interposed therebetween; a plurality of pixel areas formed over a liquid-crystal-side surface of one of this pair of substrates; and a plurality of signal lines for respectively supplying signals to the aforementioned plurality of pixel areas being formed over the liquid-crystal-side surface of the one of this pair of substrates, which signal lines extend beyond a sealing material for fixing this pair of substrates to one another and toward a peripheral portion of the one of this pair of substrates; and at least one of the plurality of signal lines is covered with stacked layers formed by stacking a first insulating film, a semiconductor layer, and a second insulating film thereover in this order.

In this manner, the signal lines which are formed to extend beyond the sealing material are covered with the stacked layer made of the first insulating film, the semiconductor layer and the second insulating film. Accordingly, even if defects, such as pinholes, occur in each of the first insulating film, the semiconductor layer and the second insulating film, it will be extremely rare for the portions of the defects to be superposed on one another on the signal lines, and so almost no external influence is exerted over the signal lines due to these defects. In this way, it is possible to avoid corrosion due to defects, such as pinholes, in the material which covers the signal lines.

In the construction described above, each of the aforementioned plurality of pixel areas is provided with a thin film transistor covered with a protective film, and the first insulating film, the semiconductor layer and the second insulating film are formed of materials which are identical to those of a gate insulating film and a semiconductor layer, both of which constitute elements of the thin film transistor, and the protective film covering the, thin film transistor, respectively.

In this case, since the first insulating film, the semiconductor layer and the second insulating film can be sequentially formed in parallel during formation of each of the pixels, there is the advantage that the present invention can be implemented without any increase in the number of manufacturing steps.

These and other objects, features and advantages of the present invention will become more apparent from the following description when taken in conjunction with the accompanying drawings.

DETAILED DESCRIPTION

Embodiments of a liquid crystal display device according to the present invention will be described with reference to the drawings.
Embodiment 1
<Equivalent Circuit of Liquid Crystal Display Device>

Figure 2:
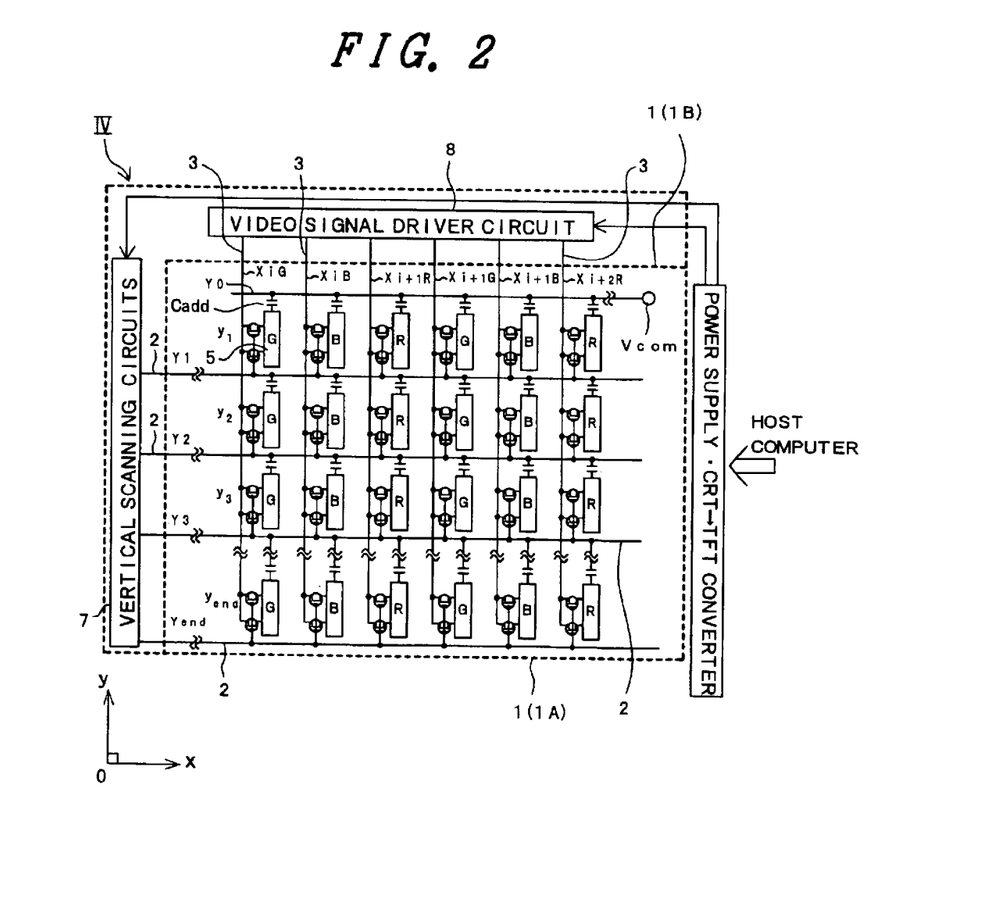
FIG. 2 is an equivalent circuit diagram showing one embodiment of the liquid crystal display device according to the present invention.

FIG. 2 is an equivalent circuit diagram showing one embodiment of a liquid crystal display device according to the present invention. FIG. 2 is a circuit diagram which is depicted to correspond to an actual geometrical arrangement.

In FIG. 2, there is shown a liquid crystal display panel 1. This liquid crystal display panel 1 has a pair of transparent substrates disposed so as to be opposed to each other with a liquid crystal interposed therebetween, and scanning signal lines 2 and video signal lines 3 are formed over a liquid-crystal-side surface of a transparent substrate 1A, which is one of the pair of transparent substrates. The scanning signal lines 2 are disposed so as to extend in the x direction of the liquid-crystal-side surface and to be juxtaposed in the y direction thereof, while the video signal lines 3 are insulated from the scanning signal lines 2 and are disposed so as to extend in the y direction and to be juxtaposed in the x direction. Incidentally, the x direction and the y direction as referred to herein intersect with each other, and the intersection angle therebetween is herein defined as an angle which is not limited to a right angle.

The rectangular areas which are each surrounded by adjacent ones of the scanning signal lines 2 and adjacent ones of the video signal lines 3 constitute pixel areas, respectively, and a thin film transistor TFT and a pixel electrode 5 are formed in each of the pixel areas. A thin film transistor TFT is turned when it receives a scanning signal from one of the scanning signal lines 2, and this causes a video signal to be supplied to a pixel electrode 5 from one of the video signal lines 3 via the thin transistor TFT which is turned on. This pixel electrode 5 is made of a transparent material, for example, comprises an ITO (Indium-Tin-Oxide) layer. A capacitance element Cadd is formed between the pixel electrode 5 and the other scanning signal line 2, and an electric charge corresponding to the video signal supplied to the pixel electrode 5 can be stored in the capacitance element Cadd for a comparatively long time.

Although not shown, a common electrode which is common to each of the pixel electrodes and is made of a transparent material is formed on a liquid-crystal-side surface of the other transparent substrate 1B which is disposed over the transparent substrate 1A constructed in this manner, with the liquid crystal interposed therebetween. The optical transmissivity of the liquid crystal between this common electrode and the pixel electrode 5 is controlled by an electric field generated therebetween.

A scanning signal is supplied to one end of each of the scanning signal lines 2 via an external terminal by a vertical scanning circuit 7. This vertical scanning circuit 7 is formed of plurality of driver ICs which are mounted on the transparent substrate 1A in a facedown manner. The output electrode of the vertical scanning circuit 7 is connected to the external terminal. Similarly, a video signal is supplied to one end of each of the video signal Lines 3 from a video signal driver circuit 8 via an external terminal. This video signal driver circuit 8 is formed of plurality of driver ICS which are mounted on the transparent substrate 1A in a facedown manner, and the output electrode of the video, signal driver circuit 8 is connected to the external terminal.

In each of the areas where the vertical scanning circuit 7 and the video signal driver circuit, 8 are respectively mounted, the edge of the transparent substrate 1B is constructed to be set back from the edge of the transparent substrate 1A. Specifically, the transparent substrate 1B is formed to be slightly smaller in area than the transparent substrate 1A, and it is disposed in such a manner that its right and bottom sides are in substantial alignment (preferably, coincide) with those of the transparent substrate 1A. The vertical scanning circuit 7 and the video signal driver circuit 8 are mounted on the area of the transparent substrate 1A that projects from the transparent substrate 1B.
<Pixel Area>

Figure 3A:
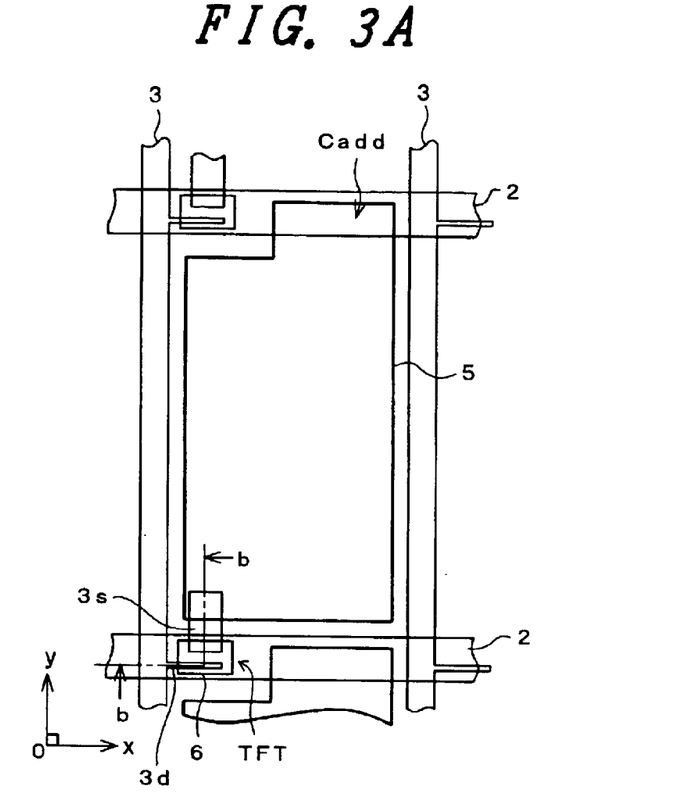
FIG. 3A is a plan view and FIG. 3B is a section view taken of the line b—b in FIG. 3A, showing one embodiment of the construction of a pixel of the liquid crystal display device according to the present invention.
Figure 3B:
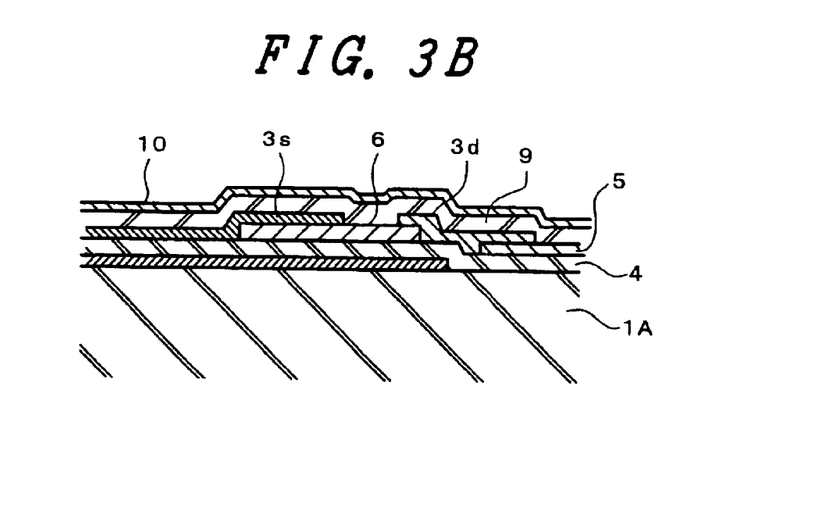

FIG. 3(A) is a plan view showing one embodiment of the construction of the above-described pixel area, and FIG. 3(B) is a cross-sectional view taken along tine b—b of FIG. 3(A).

In FIG. 3(A), the scanning signal lines 2 which are disposed so as to extend in the x direction and to be juxtaposed in the y direction are formed over the transparent substrate 1A, and an insulating film 4 is formed over the entire surface of the transparent substrate 1A to cover the scanning signal lines 2. This insulating film 4 functions as an interlayer insulating film for the scanning signal lines 2 with respect to the video signal lines 3 which will be formed later. In addition, in the area in which the thin film transistor TFT is formed, the insulating film 4 functions as a gate insulating film. Moreover, in the area in which the capacitance element Cadd is formed, the insulating film 4 functions as a dielectric film.

The pixel electrode 5 is formed over the surface of the insulating film 4, and this pixel electrode 5 is a transparent electrode made of, for example, an ITO (Indium-Tin-Oxide) film. This pixel electrode 5 is formed in such a manner that a portion thereof is superposed on one of the scanning signal lines 2 (the upper signal line as viewed in FIG. 3A), and this portion of the pixel electrode 5 constitutes the capacitance element Cadd, in which a dielectric film made of the insulating film 4 is disposed between the scanning signal lines 2 and the pixel electrode 5.

The area in which the thin film transistor TFT is formed is disposed to be superposed on the other scanning signal tine 2 (the lower signal line as viewed in FIG. 3A), and an island-shaped semiconductor layer 6 made of, for example, amorphous Si is formed in that area. A drain electrode 3d and a source electrode 3s are formed over the surface of the semiconductor layer 6, thereby forming an MIS type of transistor having a gate electrode made of a portion of the scanning signal line 2. The drain electrode 3d and source electrode 3s are formed together with the video signal lines 3.

Specifically, the video signal lines 3 which are disposed so as to extend in the y direction and to be juxtaposed in the x direction are formed, and part of each of the video signal lines 3 is formed to extend to the surface of the area in which the thin film transistor TFF is formed, thereby forming the drain electrode 3d.

The source electrode 3s which is formed at the same time as the drain electrode 3d is disposed so as to extend into the pixel area so as to be connected to the pixel electrode 5 which is formed in advance. Moreover, a protective film 9 made of, for example, a silicon nitride film is formed over the entire surface of the substrate processed in this manner, and an alignment; layer 10 for restricting the orientation of the liquid crystal is formed over the top surface of the protective film 9.

The pixel area formed in this manner is constructed so that the thin film transistor TFT is driven by a scanning signal supplied from the scanning signal line 2, causing a video signal from the video signal tine 3 to be supplied to the pixel electrode 5 via this thin film transistor TFT. If the thin film transistor TFT is turned off, the video signal supplied to the pixel electrode 5 can be stored in the capacitance element Cadd for a long time.

<Construction in the Vicinity of Driver IC>

Figure 4:
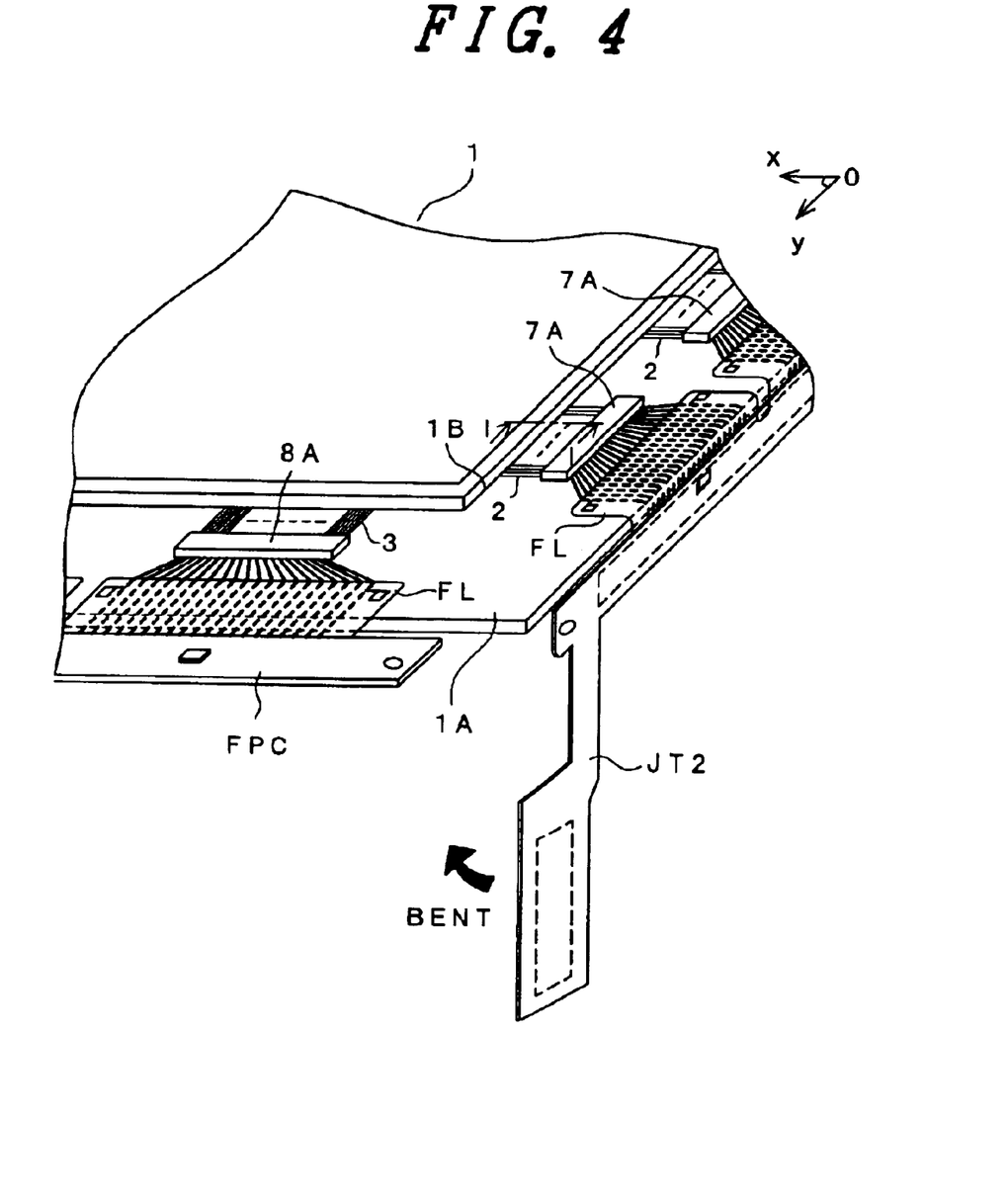
FIG. 4 is a perspective view showing the vicinity of the driver IC connected to signal lines of the liquid crystal display device in one embodiment according to the present invention.

FIG. 4 is a perspective view showing the construction in the vicinity of driver ICs 7A and 8A mounted on the transparent substrate 1A, and is a view as seen from the side indicated by arrow IV in FIG. 2.

A plurality of driver ICs, 7A which constitute the vertical scanning circuit 7 are mounted along the y direction on the y-direction side (as viewed in FIG. 4) of the transparent substrate 1A, which is projected from the transparent substrate 1B, while a plurality of driver ICs 8A, which constitute the video signal driver circuit 8, are mounted along the x direction on the x-direction side (as viewed in FIG. 4) of the transparent substrate 1A. For example, the plurality of driver ICs 7A are arranged so that a respective one of the driver ICs 7A is assigned to each of a predetermined number of groups of adjacent scanning signal lines 2.

Each of the scanning signal lines 2 is formed so as to extend from the pixel areas into the portion of the transparent substrate 1A over which the transparent substrate 1B is not formed, and is connected at one end to the output terminal of a driver IC 7A. The input terminals of the driver ICs 7A are connected to an interconnection layer formed in a peripheral portion of the transparent substrate 1A (in many cases, an edge portion of the substrate), and this interconnection layer is supplied with a signal from a flexible printed circuit board JT2. Incidentally, a similar construction is also provided on the side of the driver, ICs 8A which constitute the video signal driver circuit 8. In FIG. 4, the input terminal of any of the driver ICs 7A and 8A is covered with a film FL which is printed with the output terminal of the flexible printed circuit board JT2 or FPC.

Figure 1:
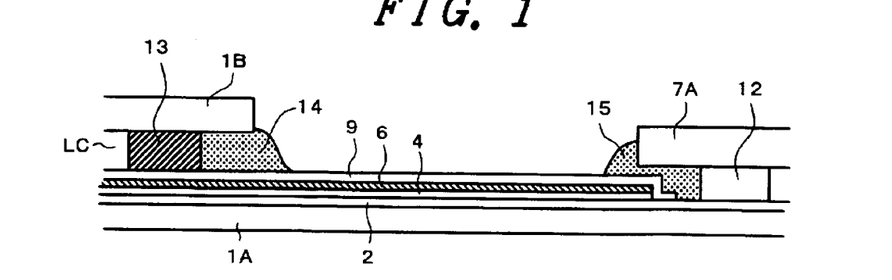
FIG. 1 is a cross-sectional view showing one embodiment of the liquid crystal display device according to the present invention.

FIG. 1 is a view showing a cross section taken along line I—I of FIG. 4. In FIG. 1, the scanning signal line 2 which is disposed so as to extend from the surface of the transparent substrate 1A beyond the edge of the transparent substrate 1B is formed on the top surface of the transparent substrate 1A, and the extended end of the scanning signal line 2 is connected to an output terminal 12 of the driver IC 7A, which is disposed in a faced down manner. This scanning signal line 2 is covered with a stacked layer formed by stacking the insulating film 4, the semiconductor layer 6 and the protective film 9 thereon in that order.

The insulating film 4, semiconductor layer 6 and protective film 9 correspond to the insulating film 4, the semiconductor layer 6 and the protective film 9 in each of the pixels, respectively. This stacked layer is formed so as to extend over the scanning signal line 2 from a liquid crystal layer LC (inside a sealing material 13) beyond a peripheral portion of the transparent substrate 1B (outside the sealing material 13), and the end portion of the stacked layer is formed to reach the area of the driver IC 7A and to extend only to the vicinity of the output terminal 12. In other words, this stacked layer is formed so as not to make contact with that portion of the scanning signal line 2 which comes in direct contact with the output terminal of the driver IC 7A (a portion which serves as a signal input terminal).

Incidentally, the transparent substrate 1B is fixed to the transparent substrate 1A by the sealing material 13 formed on the protective film 9. This sealing material 13 has the function of maintaining the gap between the transparent substrate 1A and the transparent substrate 1B at a predetermined value and of sealing the liquid crystal in the gap. An organic resin 14 is applied between the transparent substrate 1A and the transparent substrate 1B outside the sealing material 13. An organic resin 15 is applied between the transparent substrate 1A and the driver IC 7A on the side of the output terminal 12 of the driver IC 7A. These organic resins 14 and 15 are formed to improve the reliability of the seal to prevent corrosion or the hole of the underlying scanning signal line 2. A similar construction is also provided in the vicinity of the driver ICs 8A on the video signal lines 3.

In this manner, the scanning signal lines 2 (or the video signal lines 3) which are formed to extend beyond the sealing material 13 are covered with a stacked layer formed of the insulating film 4, the semiconductor layer 6 and the protective film 9. Accordingly, even if defects, such as pinholes, occur in one or all of the insulating film 4, the semiconductor layer 6 and the protective film 9, it is extremely unlikely that the portions of the defects will be superposed on one another on the scanning signal lines 2, and it can be expected in practice that almost no such portions will be superposed. For this reason, it is possible to avoid corrosion due to defects, such as pinholes, in a material which covers the scanning signal lines 2 (the video signal lines 3).

In addition, since the insulating film 4, the semiconductor layer 6 and the protective film 9 can be sequentially formed over each of the pixels and, at the same time, over the scanning signal lines 2, which extend into the peripheral portion of the substrate, there is the advantage that the number of manufacturing steps does not need to be increased to practice the present invention.

Embodiment 2

Figure 5A:
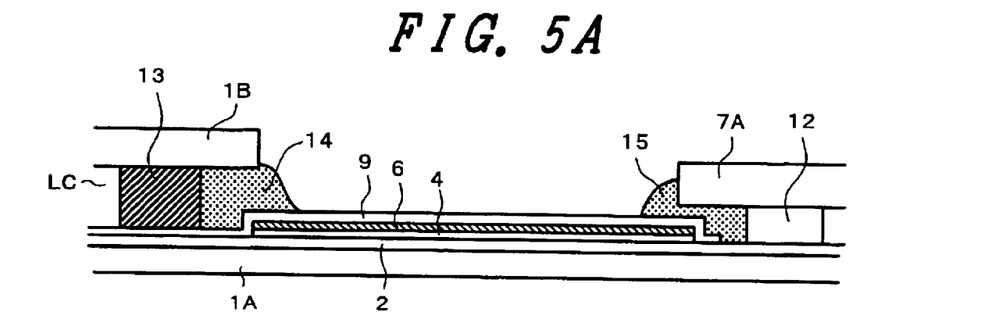
FIGS. 5A and 5B are a cross-sectional views showing other examples of the liquid crystal display device according to the present invention.

FIG. 5A is a view showing the construction of another embodiment of the liquid crystal display device according to the present invention, and is a view similar to FIG. 1. The construction of FIG. 5A differs from that of FIG. 1 in that the stacked layer formed by sequentially stacking the insulating film 4 and the semiconductor layer 6 is not formed at a location where the sealing material 13 is formed. In other words, the stacked layer is formed so as to extend from outside the sealing material 13 to the side of the driver IC 7A. In this case, the protective film 9 is formed to extend directly from inside the sealing material 13 in a manner similar to that shown in FIG. 1.

The reason for this construction is to ensure a predetermined flatness at the location where the sealing material 13 is formed, and to improve the uniformity of the gap between the transparent substrate 1A and the transparent substrate 1B. In this case, it is possible to fully avoid corrosion of the scanning signal line 2 in the vicinity of the sealing material 13 owing to the presence of the organic resin 14.

Embodiment 3

Figure 5B:
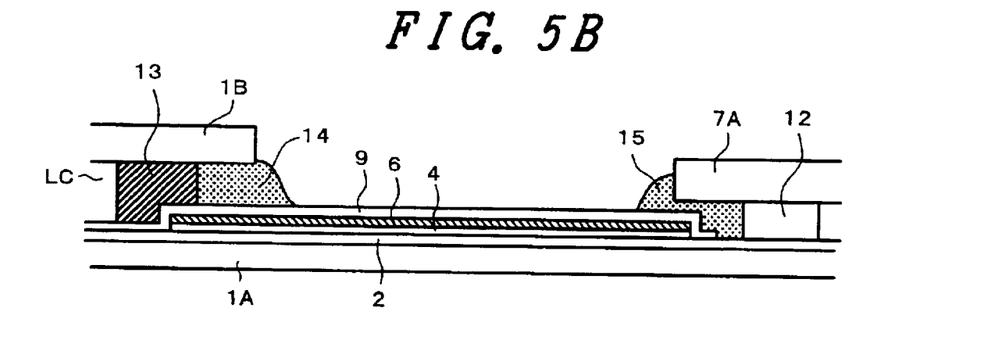

FIG. 5B is a view showing the construction of another embodiment of the liquid crystal display device according to the present invention, and is a view similar to FIG. 1. The construction of FIG. 5B differs from that of FIG. 1 in that the stacked layer formed by sequentially stacking the insulating film 4 and the semiconductor layer 6 on the scanning signal line 2 is formed to extend from a position halfway below the sealing material 13 to the side of the driver IC 7A. Specifically, the outside portion of the sealing material 13 (on the peripheral side of the transparent substrate 1A) is formed in such a manner that the stacked layer formed by sequentially stacking the insulating film 4 and the semiconductor layer 6 is interposed between a portion of the sealing material 13 and the scanning signal line 2, but the insulating film 4 and the semiconductor layer 6 do not extend all of the way under the sealing material 13 (on the side of the liquid crystal LC). In this case, the protective film 9 is formed to extend directly from inside the sealing material 13 in a manner similar to that shown in FIG. 1.

The reason for this construction is to obtain an effect having both the effect of strengthening the corrosion-preventing effect for the scanning signal line 2 and the effect of flattening the location where the sealing material 13 is formed.

Embodiment 4

Figure 6A:
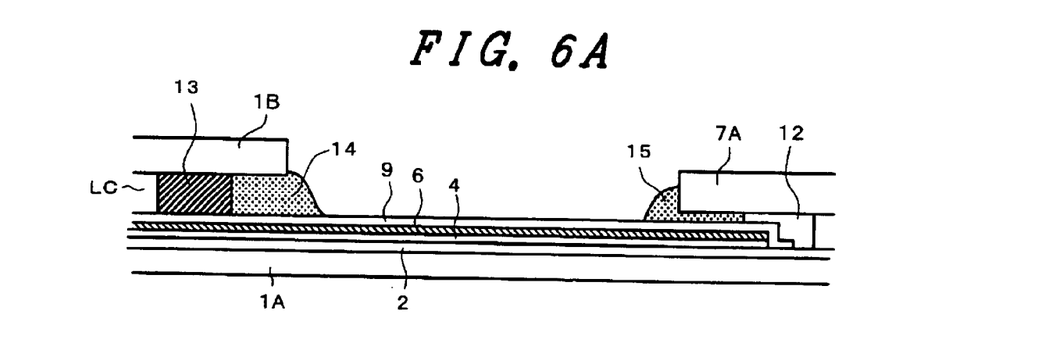
FIGS. 6A and 6B are cross-sectional views showing other examples of the liquid crystal display device according to the present invention.

FIG. 6A is a view showing the construction of another embodiment of the liquid crystal display device according to the present invention, and is a view similar to FIG. 1. The construction of FIG. 6A differs from that of FIG. 1 in that the stacked layer formed of the insulating film 4, the semiconductor layer 6 and the protective film 9 is formed to extend halfway into the output terminal 12 of the driver IC 7A. Specifically, the side of the output terminal 12 that faces the sealing material 13 is formed in such a manner that the stacked layer formed by stacking the insulating film 4, the semiconductor layer 6 and the protective film 9 in that order is interposed between a portion of the output terminal 12 and the scanning signal line 2, but this stacked layer does not extend all of the way under the output terminal 12.

The reason for this construction is to enhance the corrosion-preventing effect by covering the entire area of the scanning signal line 2 with the stacked layer.

Embodiment 5

Figure 6B:
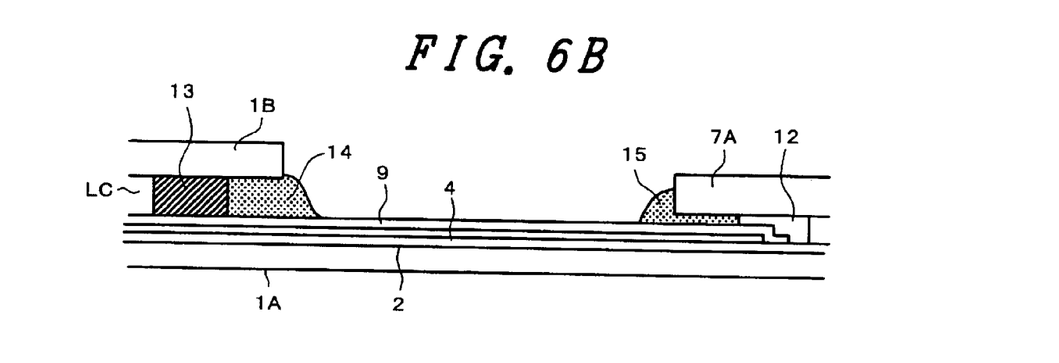

FIG. 6B is a view showing the construction of another embodiment of the liquid crystal display device according to the present invention, and is a view similar to FIG. 1. The construction of FIG. 6B differs from that of FIG. 1 in that the stacked layer which covers the scanning signal line 2 is formed as a double layer made of two layers, i.e., the insulating film 4 and the protective film 9. That is to say, the semiconductor layer 6 is not used for preventing corrosion of the scanning signal line 2.

The reason for this construction is to ensure a sufficient corrosion-preventing effect for the scanning signal line 2 by means of the stacked layer (double layer) made of the insulating film 4 and the protective film 9, and to further improve the flatness at the location where the sealing material 13 is formed.

Embodiment 6

Figure 7:
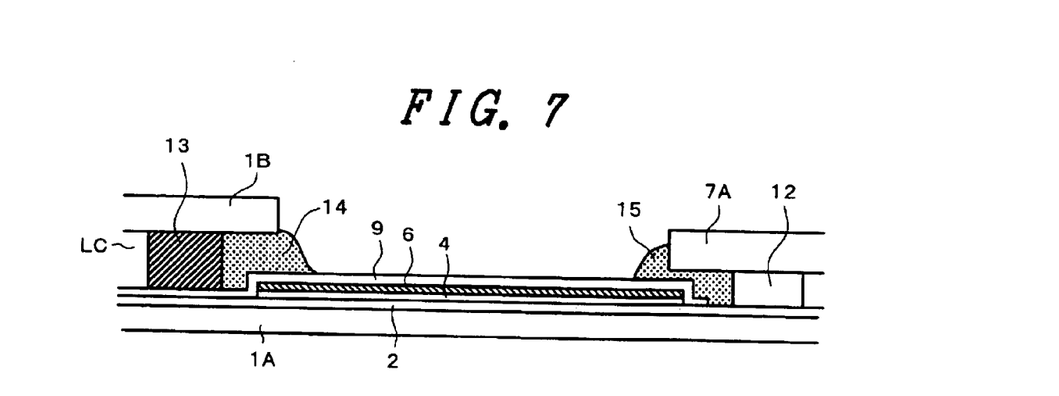
FIG. 7 is a cross-sectional view showing another example of the liquid crystal display device according to the present invention.

FIG. 7 is a view showing the construction of another embodiment of the liquid crystal display device according to the present invention, and is a view similar to FIG. 1. The construction of FIG. 7 differs from that of FIG. 1 only in that the semiconductor layer 6 from among the insulating film 4, the semiconductor layer 6 and the protective film 9 which cover the scanning signal line 2 is not formed at the location where the sealing material 13 is formed. That is to say, the semiconductor layer 6 is formed to extend only from outside the sealing material 13 to the side of the driver IC 7A.

The reason for this construction is to obtain both the effect of strengthening the corrosion-preventing effect for the scanning signal line 2 and the effect of flattening the location where the sealing material 13 is formed.

In each of Embodiments 2 to 6, reference has been made to a construction in the vicinity of the driver ICs 7A connected to the scanning signal lines 2. However, it goes without saying that a similar construction may be provided in the vicinity of the driver ICs 8A connected to the video signal lines 3.

In any of the above-described embodiments, each layer of the stacked layer which covers the signal lines is made of the same material as a predetermined layer formed in each pixel area. However, this essential to the invention, and the material need not be the same as the layer formed in each pixel area (a different material or a different process may also be used).

Each of the aforesaid embodiments has been described on the basis of a so-called COG (chip-on-glass) type of liquid crystal display device in which drivers IC are mounted on a transparent substrate. However, it goes without saying that the present invention is not limited to this type. This is because the present invention can be applied to prevention of corrosion of signal lines in any case where the signal lines are formed over a surface area of a transparent substrate 1 to which the transparent substrate 1B is not opposed.

In the above description of the embodiments, reference has been made to a liquid crystal display device which is a so-called vertical electric field type represented by a TN (Twisted Nematic) type. However, it goes without saying that the present invention can also be applied to a liquid crystal display device of the lateral electric field type (or an In-Plane-Switching type).

The lateral electric field type of liquid crystal display device is provided with pixel electrodes and common electrodes which are disposed in the pixel areas of a liquid-crystal-side surface of one of the two transparent substrates disposed so as to be opposed to each other with a liquid crystal interposed therebetween, the pixel electrodes and the common electrodes be spaced apart from each other, whereby the optical transmissivity of the liquid crystal is controlled by electric fields generated between these electrodes in parallel with the substrates.

The features of the above-described embodiments will be summarized in brief as follows. If the present invention is to be employed, it is recommended that a stacked layer, which covers signal fines that extend outside of the area of a substrate that faces a liquid crystal (that is surrounded by a sealing material), which substrate is one of a pair of substrates which constitute a liquid crystal display device, should be formed to extend from at least the area of the main surface of the aforesaid substrate that is opposed to the other of the pair of substrates to an area opposed to the lower surface of the driver IC (particularly the lower surface located on the side the other substrate). It is also recommended that the stacked layer be made of at least first and second insulating films (two kinds of insulating films formed by different processes) and preferably with a semiconductor layer inserted between these insulating films. Whether to expand this stacked layer to a further extent can be appropriately determined according to the combination conditions for the pair of substrates to be opposed to each other and the durability of the stacked film.

As is apparent from the foregoing description, it is possible to prevent corrosion which occurs in signal lines which extend from inside a sealing material outward thereof.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A display device, comprising;
   a substrate; and
   said substrate having a display area and a peripheral area;
   wherein a signal line is extended over said substrate from said display area into said peripheral area beyond a sealing material which at least partially delimits said display area and said peripheral area of said substrate, and first insulating film, a semiconductor layer, and a second insulating film in this order are provided over said signal line at least said peripheral area.

2. A display device according to claim 1, wherein said first insulating film, said semiconductor layer, and said second insulating film are formed so as to extend into said display area.

3. A display device according to claim 1, wherein one end of said signal line which extends at said peripheral area is electrically connected to an output terminal, and one end of said first insulating film, said semiconductor layer, and said second insulating film is covered by an organic resin which is formed close to said output terminal.

4. A display device according to claim 3, further comprising a drive IC mounted on said peripheral area, wherein said output terminal connected to said driver IC.

5. A display device according to claim 4, wherein said first insulating film, said semiconductor layer, and said second insulating film are formed so as to extend into a portion below said driver IC.

6. A display device according to claim 4, wherein at least one portion of said first insulating film, said semiconductor layer, and said second insulating film is overlapped by said driver IC.

7. A display device according to claim 4, wherein said display area comprises a plurality of pixel areas.

8. A display device according to claim 7, wherein each of said plurality of pixel areas is formed by an area surrounding a plurality of signal lines and a plurality of scanning lines.

9. A display device according to claim 3, wherein said first insulating film, said semiconductor layer, and said second insulating film are formed so as to extend into a position halfway into said output terminal.

10. A display device, comprising;
    a substrate;
    a signal line which is extended over said substrate from a display area of said substrate into a peripheral area of said substrate beyond a sealing material which at least partially delimits said display area and said peripheral area of said substrate; and
    a first insulating film, a semiconductor layer, and a second insulating film are formed over said signal line at least at said peripheral area.

11. A display device according to claim 10, wherein said first insulating film, said semiconductor layer, and said second insulating film are formed in this order.

12. A display device according to claim 11, wherein said first insulating film, said semiconductor layer, and said second insulating film are formed so as to extend into said display area.

13. A display device according to claim 11, wherein one end of said signal line which extends at said peripheral area is electrically connected to an output terminal, and one end of said first insulating film, said semiconductor layer, and said second insulating film is covered by an organic resin which is formed close to said output terminal.

14. A display device according to claim 13, further comprising a drive IC mounted on said peripheral area, wherein said output terminal connected to said driver IC.

15. A display device according to claim 14, wherein said first insulating film, said semiconductor layer, and said second insulating film are formed so as to extend into a portion below said driver IC.

16. A display device according to claim 14, wherein said first insulating film, said semiconductor layer, and said second insulating film are formed so as to extend into a position halfway into said output terminal.

17. A display device according to claim 14, wherein at least one portion of said first insulating film, said semiconductor layer, and said second insulating film is overlapped by said driver IC.

18. A display device according to claim 11, wherein said display area comprises a plurality of pixel areas.

19. A display device according to claim 18, wherein each of said plurality of pixel areas is formed by an area surrounding a plurality of signal lines and a plurality of scanning lines.

20. A display device, comprising;
    a substrate;
    a sealing material formed over said substrate and at least partially delimiting a peripheral area of said substrate which is formed on one side of said sealing material;
    a first insulating film, a semiconductor layer, and a second insulating film formed at least at said peripheral area of said substrate; and
    a signal line formed under said first insulating film, said semiconductor layer, and said second insulating film.

21. A display device according to claim 20, wherein said signal line is overlapped with said first insulating film, said semiconductor layer, and said second insulating film.

22. A display device according to claim 21, wherein said signal line is extended on said substrate from a display area of said substrate into said peripheral area of said substrate, said sealing material at least partially delimiting said display area and peripheral area.

23. A display according to claim 20, wherein one end of said signal line which extends at said peripheral area is electrically connected to an output terminal, and one end of said first insulating film, said semiconductor layer, and said second insulating film is covered by an organi resin which is formed close to said output terminal.

24. A display device according to claim 23, wherein said display area comprising a plurality of pixel areas.

25. A display device according to claim 24, wherein each of said plurality of pixel areas is formed by an area surrounding a plurality of signal lines and a plurality of scanning lines.

26. A display device according to claim 23, further comprising a drive IC mounted on said peripheral area, where said output terminal connected to said driver IC.

27. A display device according to claim 23, wherein said first insulating film, said semiconductor layer, and said second insulating film are formed so as to extend into a portion below said driver IC.

28. A display device according to claim 23, wherein said first insulating film, said semiconductor layer, and said second insulating film are formed so as to extend into a position halfway into said output terminal.

29. A display device according to claim 23, wherein at least said one portion of said first insulating film, said semiconductor layer, and a second insulating film is overlapped by said driver IC.

* * * * *